United States Patent
Greenfield et al.

(10) Patent No.: US 9,247,033 B2
(45) Date of Patent: Jan. 26, 2016

(54) ACCESSING PAYLOAD PORTIONS OF CLIENT REQUESTS FROM CLIENT MEMORY STORAGE HARDWARE USING REMOTE DIRECT MEMORY ACCESS

(71) Applicant: Google Inc., Mountain View, CA (US)

(72) Inventors: Lawrence Elias Greenfield, New York, NY (US); Michael Roger Marty, Madison, WI (US); Frank Dabek, New York, NY (US); Daniel Jonathan Peng, New York, NY (US)

(73) Assignee: Google Inc., Mountain View, CA (US)

( * ) Notice: Subject to any disclaimer, the term of this patent is extended or adjusted under 35 U.S.C. 154(b) by 367 days.

(21) Appl. No.: 13/727,007

(22) Filed: Dec. 26, 2012

(65) Prior Publication Data

US 2014/0181181 A1 Jun. 26, 2014

(51) Int. Cl.
G06F 13/00 (2006.01)
H04L 29/06 (2006.01)
H04L 29/08 (2006.01)

(52) U.S. Cl.
CPC .............. *H04L 69/22* (2013.01); *H04L 67/32* (2013.01)

(58) Field of Classification Search
CPC .............. H04L 29/08072; H04L 29/06; H04L 29/0809; H04L 29/06047; H04L 12/581; H04L 29/06027; H04L 67/32; H04L 69/22; G06Q 30/02; G06Q 10/10
USPC .................................................. 709/203, 204
See application file for complete search history.

(56) References Cited

U.S. PATENT DOCUMENTS

| | | | |
|---|---|---|---|
| 4,640,357 A | 2/1987 | Jones | |
| 5,594,490 A | 1/1997 | Dawson et al. | |
| 7,539,869 B1 | 5/2009 | Mullan et al. | |
| 7,796,515 B2 | 9/2010 | Griffin et al. | |
| 8,046,624 B2 | 10/2011 | Williamson et al. | |
| 8,301,739 B1 | 10/2012 | Krishnan et al. | |
| 2003/0126238 A1 | 7/2003 | Kohno et al. | |
| 2004/0252709 A1* | 12/2004 | Fineberg | 370/412 |
| 2009/0089638 A1 | 4/2009 | Heise et al. | |
| 2011/0289176 A1 | 11/2011 | Toyama | |
| 2011/0320669 A1 | 12/2011 | Scandurra et al. | |
| 2013/0144951 A1* | 6/2013 | Viswanath et al. | 709/204 |

OTHER PUBLICATIONS

International Search Report and Written Opinion for Aplication No. PCT/US2013/047100 dated Sep. 30, 2013.

* cited by examiner

*Primary Examiner* — Robert B Harrell
(74) *Attorney, Agent, or Firm* — Honigman Miller Schwartz and Cohn LLP

(57) ABSTRACT

A method of processing client requests on a data processing apparatus. The method includes receiving control portions of client requests from respective clients. Each client request has control and payload portions, where the payload portion includes data and the control portion includes information relating to the data of the payload portion. The method also includes buffering, in non-transitory memory of the data processing apparatus, the received client request control portions, and retrieving the payload portion of a client request before processing that client request.

30 Claims, 8 Drawing Sheets

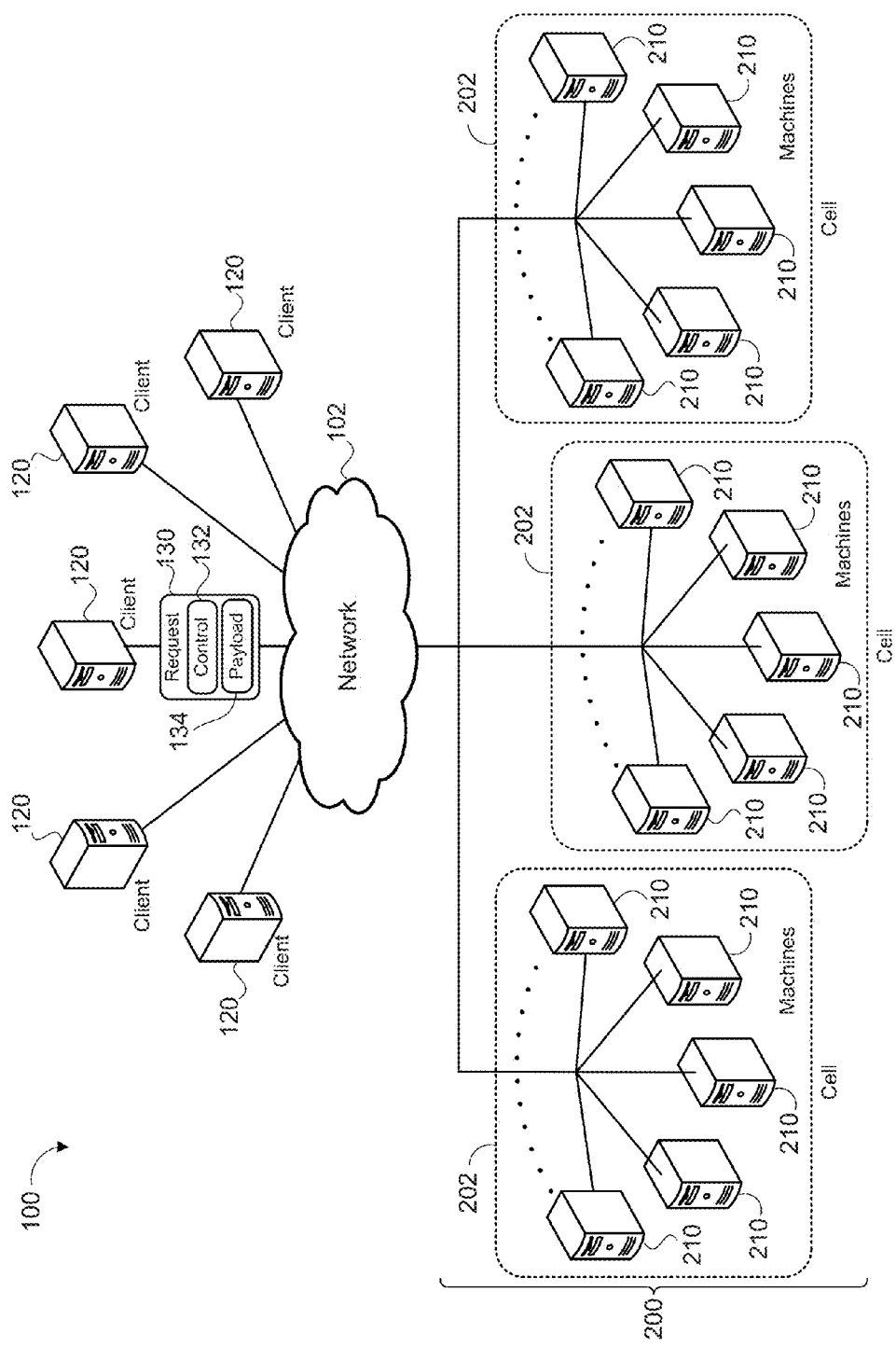

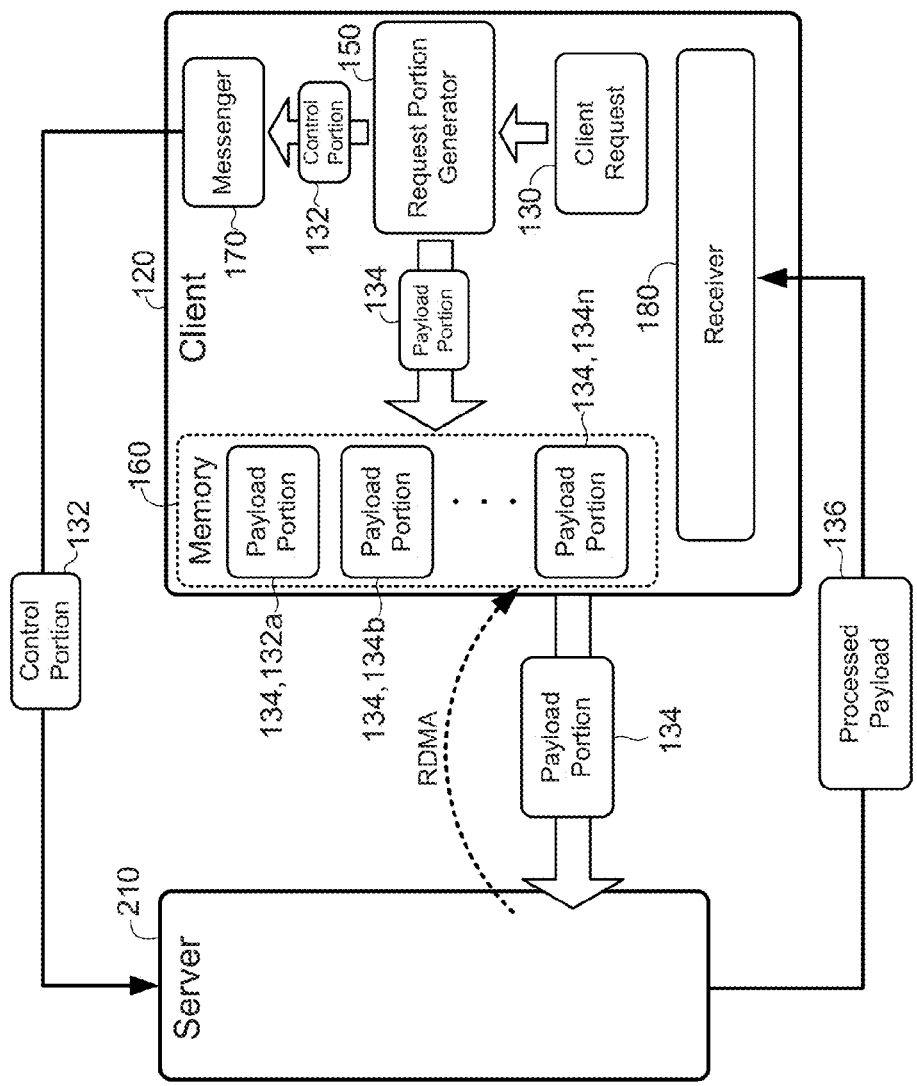

ACCESSING PAYLOAD PORTIONS OF CLIENT REQUESTS FROM CLIENT MEMORY STORAGE HARDWARE USING REMOTE DIRECT MEMORY ACCESS

TECHNICAL FIELD

This disclosure relates to a communication system between servers and clients.

BACKGROUND

A server is generally dedicated to run one or more services requested by one or more clients (e.g., user). The server usually offers specific services such as a database server providing database service to the client, a file server providing a location for files shared among different clients, a mail server providing mail from one client to another, a print server connecting a client to a specific printer over a network, a web server allowing a client to view the content of a website, etc. Each server, regardless of the service it provides, usually includes a hardware portion and a software portion. The hardware portion allows the software portion to run a software program that performs the specific server service.

The server receives requests from clients and performs a specific task based on the client request. The server often receives an unpredictable pattern of requests at various priorities. These requests are sometimes queued for processing in a buffer, and a major problem in server design is managing an incoming queue of client requests. The server should try to maintain the size of the buffer to avoid running out of memory. In some instances, when the buffer receives a great number of requests from clients, the server rejects the requests or suspends the connection and stops reading any incoming client requests. Rejecting the requests consumes network and computer memory resources because the client resends the request.

SUMMARY

One aspect of the disclosure provides a method of processing client requests on a data processing apparatus. Each client request has a control portion and a payload portion, where the payload portion includes data and the control portion includes information relating to the data of the payload portion. The method includes receiving control portions of client requests from respective clients, buffering, in non-transitory memory of the data processing apparatus, the received client request control portions, and retrieving the payload portion of a client request before processing that client request.

Implementations of the disclosure may include one or more of the following features. In some implementations, the method includes prioritizing the client control portions for sequential processing of the client requests. The method may include prioritizing the client control portions based on at least one of a priority, a size, a user identifier, a client identifier, a latency, a device identifier, or a control portion verification. Additionally or alternatively, the method may include sequentially processing client requests based on their respective prioritization. The method may include retrieving the payload portion of a client request having a first highest prioritization, a second highest prioritization, or a third highest prioritization.

In some implementations, retrieving the payload portion of the client request includes accessing non-transitory memory of the client using remote direct memory access. After processing a client request, the method may include sending a processed payload to the client of the processed client request. Additionally, the method may include determining if the client of the processed client request has sufficient memory available to receive the processed payload, and sending the processed payload to the respective client when the client has sufficient memory available.

The control portion may include a time duration for completion of the client request. The method may include sending the respective client a message when its client request cannot be processed within the specified time duration. Additionally or alternatively, the method may include rejecting a client request when that client request is non-processable within the specified time duration.

Another aspect of the disclosure provides a system executing on a data processing apparatus for processing client requests. The system includes a receiver, a buffer, and a payload retriever. The buffer executes on the data processing apparatus and receives control portions of client requests from respective clients. Each client request has control and payload portions, where the payload portion includes data and the control portion includes information relating to the data of the payload portion. The buffer may buffer, in non-transitory memory of the data processing apparatus, the received control portions of the client request. The payload retriever executes on the data processing apparatus and retrieves the payload portion of a client request to process that client request.

The receiver may prioritize the client control portions for sequential processing of the client requests. Additionally, the receiver may prioritize the client control portions based on at least one of a priority, a size, a user identifier, a client identifier, a latency, a device identifier, or a control portion verification. In some examples, the payload retriever retrieves the payload portion of a client request having a first highest prioritization, a second highest prioritization, or a third highest prioritization.

In some implementations, the payload retriever accesses non-transitory memory of the client using remote direct memory access (RDMA). The system may include a request processor that processes a client request and sends a processed payload to the client of the processed client request. Additionally, or alternatively, the request processor may sequentially processes the client requests based on their respective prioritization. In some examples, the request processor determines if the client of the processed client request has sufficient memory available to receive the processed payload, and if the client does have sufficient memory available the request processor sends the processed payload to the respective. The control portion may include a time duration for completion of the client request, and when a client request is non-processable within the specified time duration, the request processor sends the respective client a message.

In yet another aspect of the disclosure, a method of sending a client request to a data processing apparatus includes generating control and payload portions of the client request. The payload portion includes data and the control portion includes information relating to the data of the payload portion. The method includes sending the control portion of the client request to data processing apparatus, receiving a retrieval request for retrieving the payload portion of the client request, and allowing access to the payload portion of the client request.

In some implementations, the method includes allowing retrieval of the payload portion through remote direct memory access. The client control portion may include at least one of a priority, a size, a user identifier, a client identifier, a latency, a device identifier, or a control portion verification. After sending the control portion of the client request, the method may include receiving a processed payload from the data processing apparatus corresponding to the payload portion of the client request. Additionally, the method may further include receiving the processed payload when the client has sufficient memory capacity. In some examples, the method includes sending multiple control portions of corresponding client requests to the data processing apparatus in a first sequential order, and receiving retrieval requests for payload portions of the client requests in a second sequential order different form the first sequential order.

In some implementations, the control portion includes a time duration for completion of the client request. The method may include receiving a message from the data processing apparatus when the client request is non-processable within the specified time duration. Additionally, the method may include resending the client control portion of the client request when the client request is non-processable within the specified time duration.

In yet another aspect of the disclosure, a system for sending a client request to a data processing apparatus includes a request portion generator, a messenger, and a non-transitory memory. The request portion generator generates control and payload portions of the client request. The payload portion includes data, and the control portion includes information relating to the data of the payload portion. The messenger sends the control portion of the client request to the data processing apparatus. The non-transitory memory stores the payload portion, accessible for retrieval by the data processing apparatus.

In some implementations, the non-transitory memory is accessible by the data processing apparatus through remote direct memory access. In some examples, the client control portion includes at least one of a priority, a size, a user identifier, a client identifier, a latency, a device identifier, or a control portion verification. Additionally or alternatively, the control portion may include a time duration for completion of the client request.

In some implementations, the system includes a receiver that receives a processed payload from the data processing apparatus corresponding to the sent control portion of the client request. The receiver may allow receipt of the processed payload when the non-transitory memory has sufficient capacity. In some examples, the receiver receives a message from the data processing apparatus when the client request is non-processable within the specified time duration. In some examples, the messenger sends multiple control portions of corresponding client requests to the data processing apparatus in a first sequential order, and the receiver receives processed payload portions from the data processing apparatus in a second sequential order different form the first sequential order. The messenger nay resend the client control portion of the client request when the client request is non-processable within the specified time duration.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is a schematic view of an exemplary machine cluster system having client request processing system.

FIGS. 4A and 4B are schematic views of an exemplary communication between a client and a server.

Like reference symbols in the various drawings indicate like elements.

DETAILED DESCRIPTION

Figure 1B:
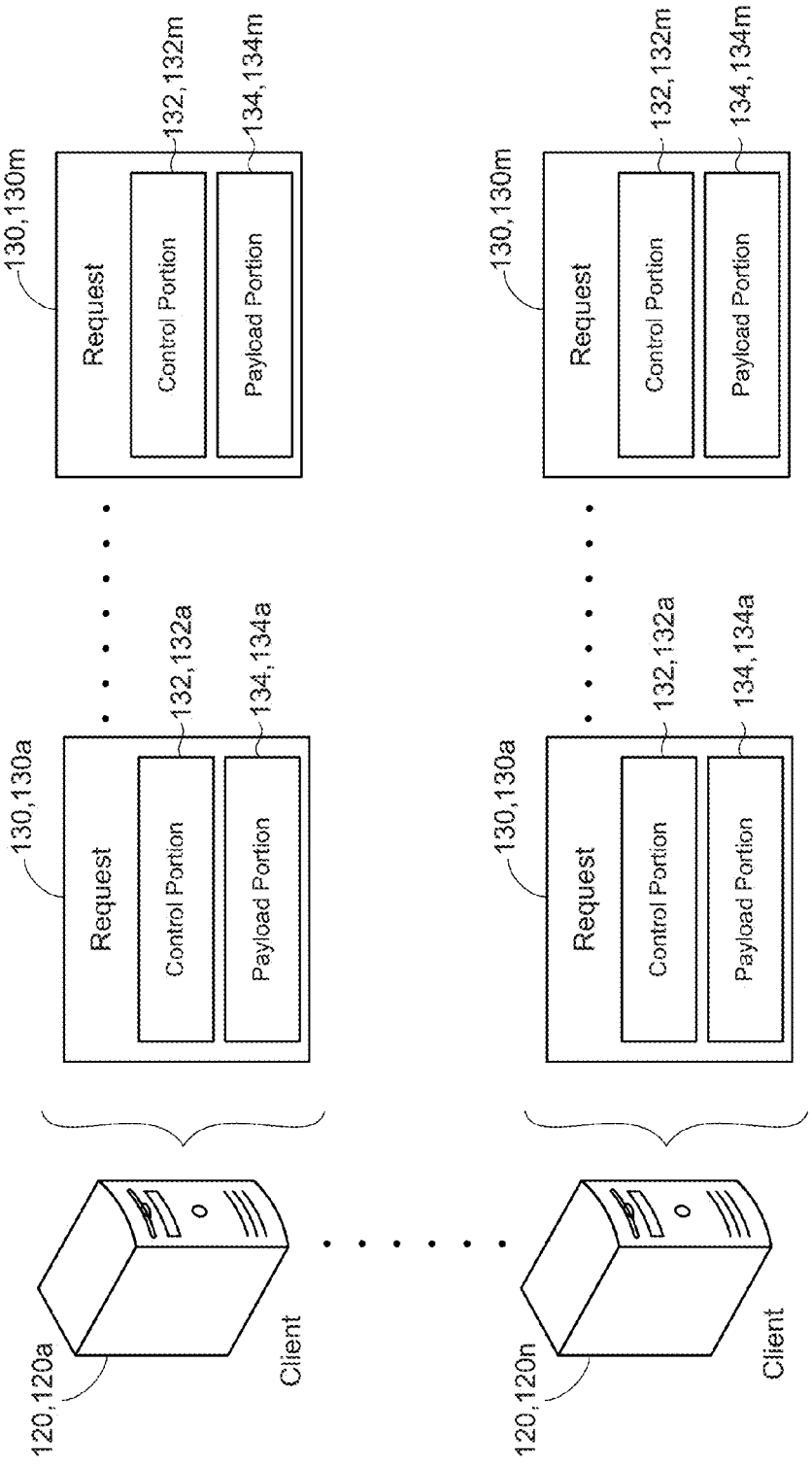
FIG. 1B is a schematic view of an exemplary client system of FIG. 1A.
Figure 2:
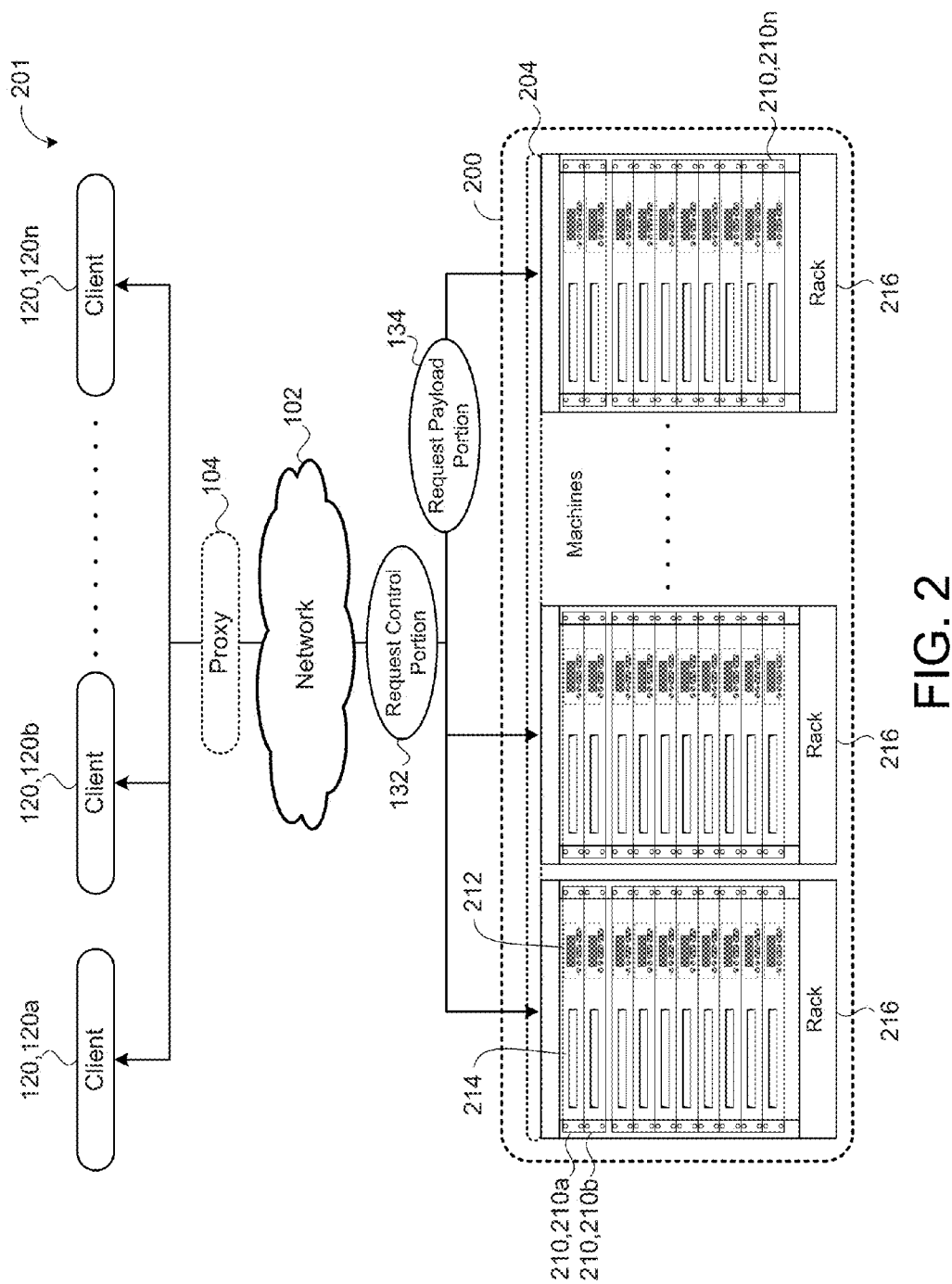
FIG. 2 is a schematic view of an exemplary client-server system.

Referring to FIGS. 1A, 1B, and 2, in some implementations, a cluster system 100 includes a cluster 200 of machines 210 (e.g., memory hosts, computing processors, computers, etc.) grouped in cells 202. The cluster 200 may implement a distributed system 201 that includes loosely coupled machines 210, 210a-n (e.g., computers or servers implemented as memory hosts or processors), each having a computing resource 212 (e.g., one or more processors) in communication with storage resources 214 (e.g., non-transitory memory, flash memory, dynamic random access memory (DRAM), phase change memory (PCM), and/or disks). The distributed system 201 may include a storage abstraction (e.g., key/value store or file system) overlain on the storage resources 214 allows scalable use of the storage resources 214 by one or more clients 120, 120a-n. The clients 120 may communicate with the machines 210 through a network 102.

A client/server model allows a client 120 to request a service from a machine 210, also referred to herein as a server 210. The server 210 is often dedicated to run one or more requests 130 received from one or more clients 120. Usually, and as shown in the figures, the client/server communication occurs over a computer network 102 with the client 120 and the server 210 having separate hardware devices at different locations. One of the central problems of client/server models in a cluster system 100 is the great number of clients 120 and machines 210 within the cluster system 100. In such systems, any given server 210 is shared by many clients 120 which may overwhelm the server 210 with client requests 130.

The client request 130 includes two portions, the control portion 132 and the payload portion 134. The control portion 132 is relatively small and contains information (e.g., metadata) about the payload portion 134, such as priority, size, etc. The payload portion 134 includes data associated with the control portion 132. Therefore, the payload portion 134 is usually larger in size than the control portion 132, because it contains more data.

In cases where one or more clients 120 send requests 130 to a server 210 that each include both the control portion 132 and the payload portion 134, a bottleneck problem may occurs when the performance of the system is limited by a number of limited components, such as storage resources 24. It is often the case that the server 210 receives a large number of client requests 130, and if each request 130 includes the control and payload portions 132, 134, the server 210 might receive more data than its storage resources 214 can handle. The server 210 may then overload with requests 130 and potentially run out of memory. Additionally, or alternatively, a head-of-line blocking may occur. The head-of-line blocking (HOL blocking) occurs when the first input (i.e., the head of the input buffer) holds up the rest of the inputs in the buffer. The other inputs in the buffer cannot be processed unless the first input is either processed or removed. Since a single connection may carry requests 130 at various priority levels, suspending the connection suspends requests 103 at all priority levels (e.g., resulting in head-of-line blocking). Moreover, rejecting requests 130 consumes network and CPU resources when the client 120 must retry the request 130, and may make scheduling more difficult because the server 210 no longer knows about the request 130. On the other hand, if the client 120 sends only the control portion 132 of the request 130 to the server 210 first, the server 210 has comparatively more available storage resources 214 to handle a relatively larger number of requests 130. The server 210 may retrieve the payload portion 134 at a later time, such as at the time of processing the request 130.

Figure 3:
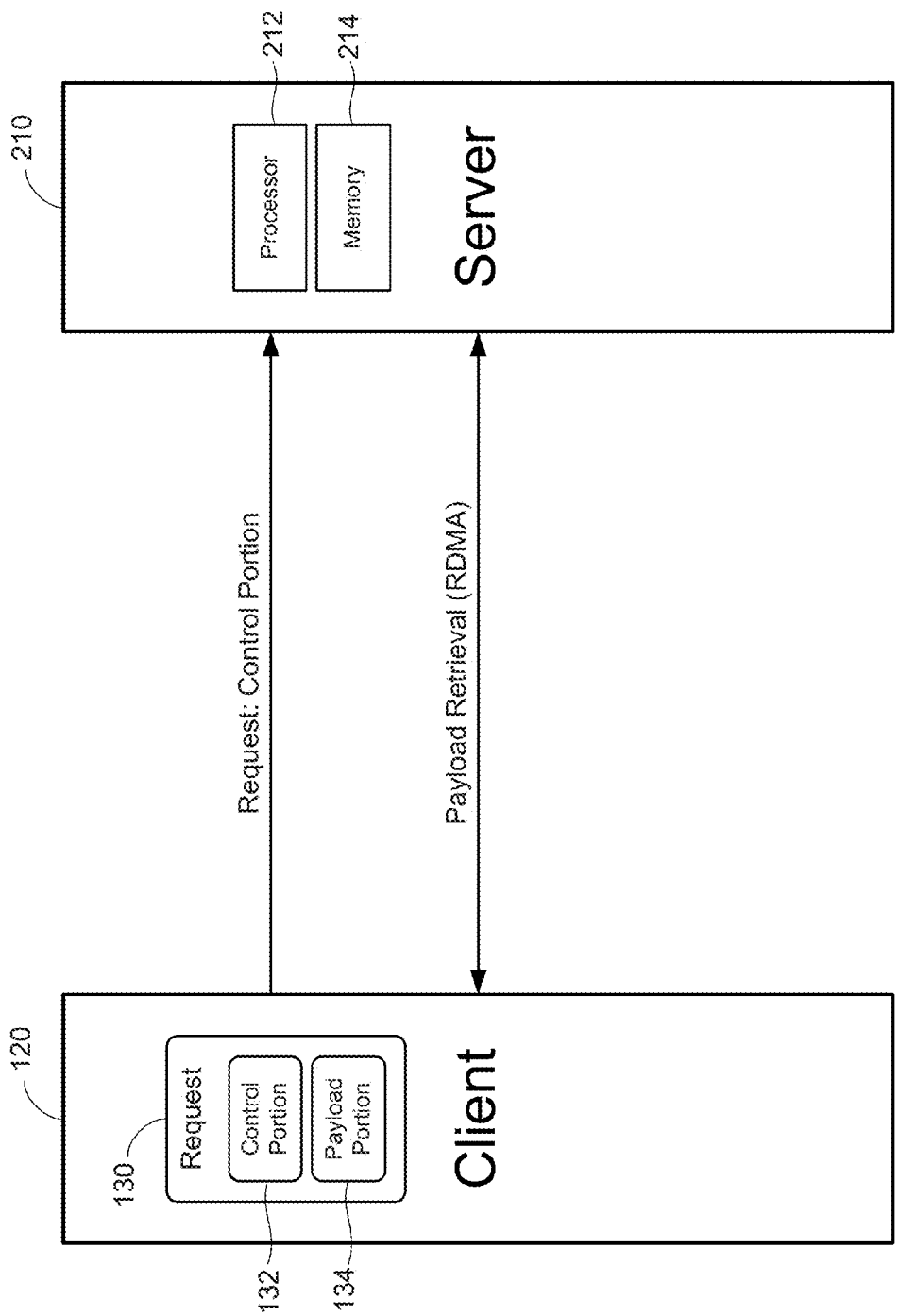
FIG. 3 is a schematic view of an exemplary communication between a client and a server.

FIG. 3 provides an overview of the communication between the client 120 and the server 210. In some implementations, the client 120 sends the control portion 132 to the server 210. The server 210 stores the request in its memory 214 until the processor 212 is ready to process the request 130. When the processor 212 is available and ready to process the request 130, the server 210 retrieves the payload portion 134 of the request 130 and processes the request 130. In some examples, the server uses remote direct memory access (RDMA) to retrieve the payload portion 134 of the respective control portion 132 of the request 130. RDMA reduces data demands on the network 102 by directly retrieving the required data. RDMA does not involve either one of the operating systems of the server 210 or the client 120, eliminating the need for extra central processing units (CPUs), caches, or context switches. In addition, RDMA may retrieve the payload portion 134 of the client request 130 in parallel operation as the server 210 is processing a different client request 130. Although, the client payload 134 retrieval process is describes using RDMA, other suitable retrieval processes and methods may be used as well.

Figure 4B:
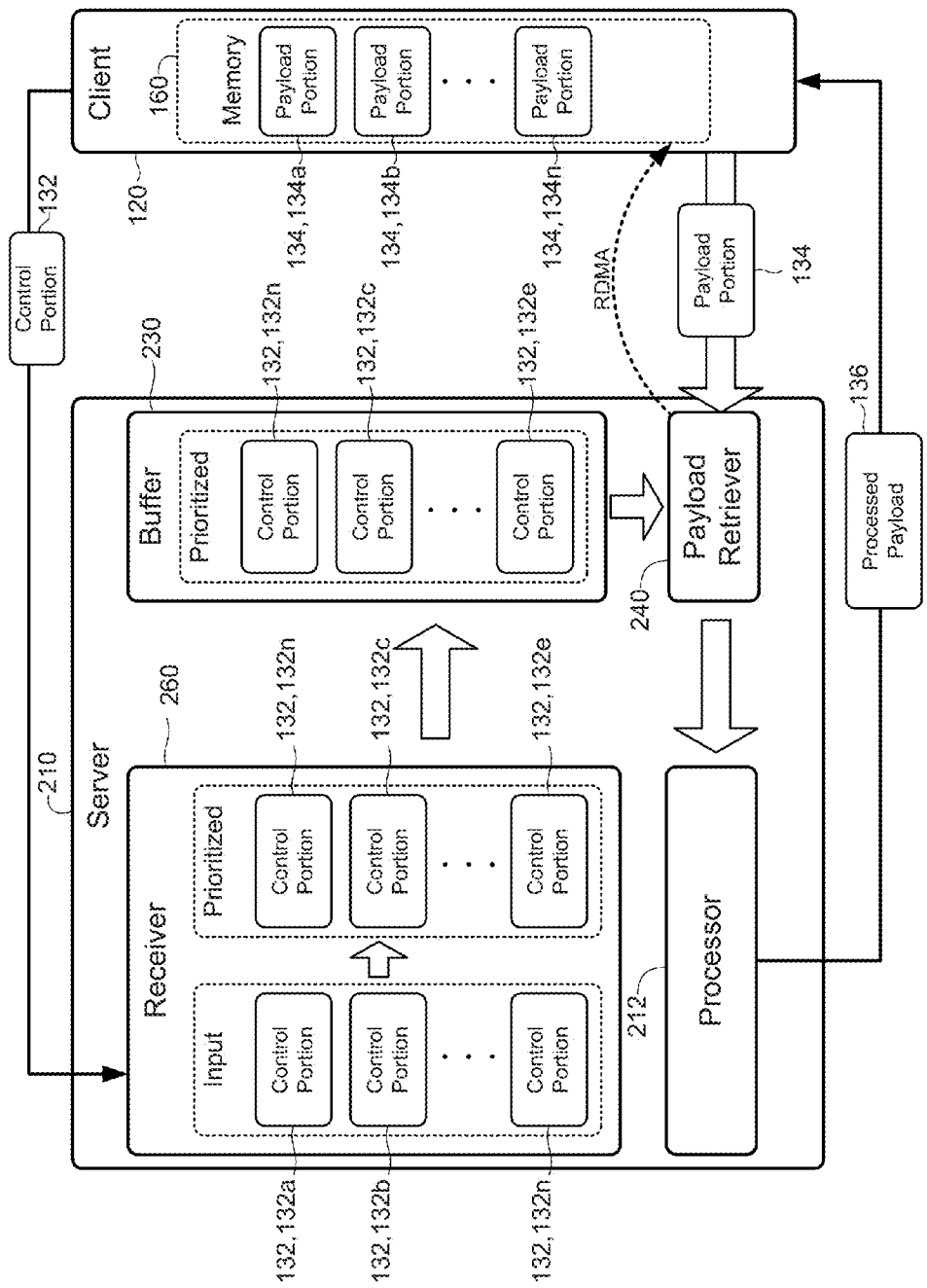

Referring to FIGS. 4A and 4B, in some implementations, the client 120 includes a request portion generator 150, a storage resource 160 (e.g., non-transitory memory, flash memory, dynamic random access memory (DRAM), phase change memory (PCM), and/or disks), and a messenger 170. Prior to sending a control portion 132 to the server 210, the request portion generator 150 of the client 120 divides the client request 130 into a payload portion 134 and a control portion 132. The client 120 stores the payload portion 134 in the memory 160. In some examples, the memory 160 is accessible by the server 210 for later retrieval of the payload portion 134. Additionally or alternatively, the memory 160 may be accessible by the server 210 through remote direct memory access (RDMA). The messenger 170 sends the control portion 132 to the server 210. The control portion 132 may include one or more of the following (e.g., as metadata): a request priority (e.g., high, medium, or low priority), a size, a user identifier, a client identifier, a latency, a device identifier, a control portion verification. Other information regarding the client 120 or the client request 130 may be included in the control portion 132. In some examples, the messenger 170 sends the control portions 132 in a first sequence; however, the receiver 180 may not receive the processed payloads 136 of the corresponding sent control portions 132 in the same order as the control portions 132 were sent. In some examples, the client 120 reserves a portion of the memory 160 to the processed payloads 136 sent from the server 210.

In some example, the client 120 includes a receiver 180, for receiving a processed payload portion 136 from the server 210 of a corresponding control portion 132 previously sent to the server 210. Additionally, or alternatively, the receiver 180 receives the processed payload 136 only when the client storage resource 160 has enough storage space to receive the processed payload 136.

In some examples, the client 120 requires that a certain request 130 is processed within a specific duration of time. The client 120 may include a time duration for completion of the request 130 in the control portion 132 sent to the server 210. The server 210 may determine if it can process the request 130 within the specific time requested by the client 120. If the server 210 cannot process the request in the specified time duration, the server 210 sends the receiver 180 a message indicating that the request 130 cannot be processed. In such instances, the client 120 may resend the request to the same or another server 210.

The server 210 may include a buffer 230, a payload retriever 240, a processor 212, and a receiver 260. The receiver 260 receives the control portion 132 sent from the client messenger 170. In some examples, the receiver 260 prioritizes the client control portions 132 based on one or more of the following information: a request priority (e.g., high, medium, or low priority), a size, a user identifier, a client identifier, a latency, a device identifier, a control portion verification. The receiver 260 may prioritize the client portions 132 based on any type of information, regarding the client 120 or the client requests 130, included in the received client control portion 132. After prioritizing the requests 130 based on information contained in the control portion 132, the receiver 126 sends the prioritized control portions 132 to the buffer 260. The buffer 260 maintains the control portions 132 in the order specified by the receiver 260. The buffer 260 is a physical memory storage (e.g., non-transitory memory, flash memory, dynamic random access memory (DRAM), phase change memory (PCM), and/or disks) for storing the control portion 132 before being processed.

In some examples, the payload retriever 240 receives the control portion 132 of a client request 130 from the buffer 230 and retrieves the corresponding payload portion 134 from the client 120. When the payload retriever 240 receives the corresponding payload portion 134 of the control portion 132, the processor 212 can process the client request 130. Such process avoids server memory 230 allocation for the retrieved payloads 134 waiting to be processed. However, in some examples, the payload retriever 240 retrieves the payload portion 134 of a corresponding control portion 132 only when it has sent the previous client request 130 to the processor 212. The payload portion 240 may retrieve a specified number of payload portions 134 corresponding to the control portions 132 that are ready to be processed. For example, the payload retriever 240 may consider the last three control portions 132 in the buffer 230 and retrieve their corresponding payload portions 134 in preparation for the processor 212 to process the client request 130. This allows the processor 212 to continuously process client requests 130 without waiting for the payload retriever 240 to retrieve the payload portions 132 from the client memory. Once the processer 212 processes the client request 130, the server 210 sends the processed payload 136 to the client 120.

The process of allowing the client 120 to send the control portion 132 of a client request 13, and allowing the server 210 to retrieve the payload portion 134 when it is ready to process the request 130, gives the server 210 the opportunity to receive a larger number of requests 130 because the received requests 130 include only the control portion 132 of the request 130 which is relatively smaller in size than the payload portions 134. As an example, the payload portion 134 is often hundreds of kilobytes, while the respective control portion 132 is only hundreds of bytes. Therefore, the server 210 is able to receive 1000 times more requests before it might run out of memory. This provides better isolation, prioritization, and improves long-tail latency.

Referring again to FIG. 2, in some implementations, a proxy 104 interfaces between one or more clients 120 and a server 210. The proxy 104 may receive requests 130 from the clients 120 and forward only the control portion 132 to the appropriate server 210 (e.g., based on the control portion 132). The proxy 104 may send the payload portion 134 to the appropriate server 210 when requested by that server 210. Alternatively, the proxy 104 may receive only the control portion 132 from the client 120 and then forward the control portion 132 to the appropriate server 210, and only request the payload portion 134 from the client 120 when the server 210 requests the payload portion 134, therefore, lessening the need for buffering inside the proxy 104.

Figure 5:
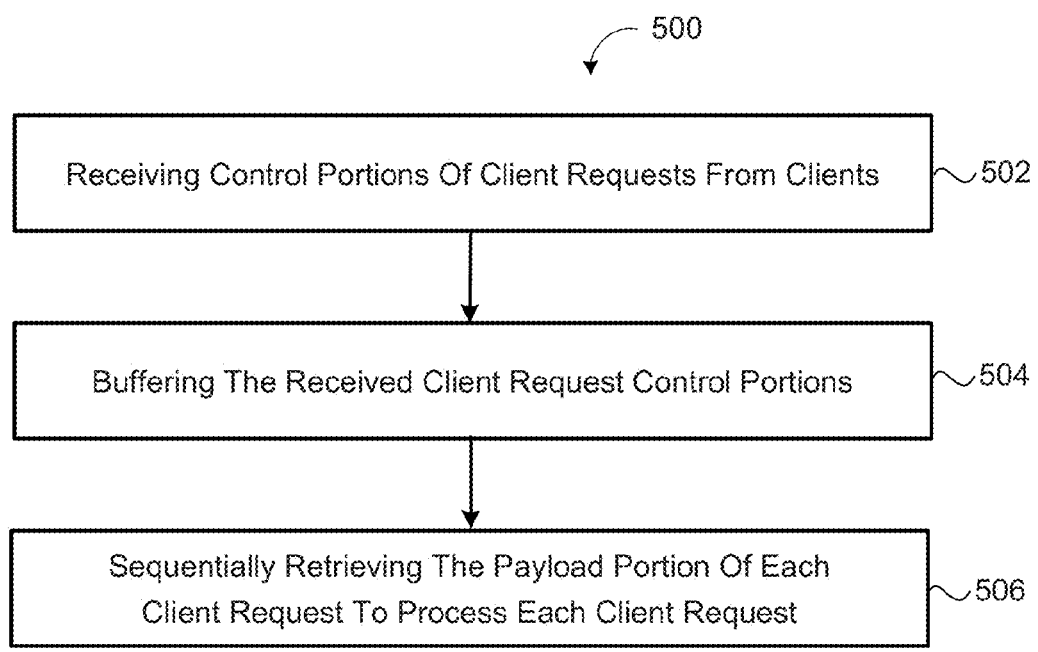
FIG. 5 provides an exemplary arrangement of operations for a method of processing client requests.

FIG. 5 provides an exemplary arrangement of operations for a method 500 of processing client requests 130 on a data processing apparatus 100. The method includes receiving 502 control portions 132 of client requests 130 from respective clients 120. Each client request 130 has a control portion 132 and a payload portion 134. The control portion 132 includes information relating to data of the payload portion 134. Therefore, the payload portion 134 is larger in size than the control portion 134, because it includes more data. The method 500 also includes buffering 504, in non-transitory memory 214 of the data processing apparatus 210, the received client request control portions 132, and retrieving the payload portion 134 of a client request 134 before processing that client request 130.

In some examples, the method includes prioritizing the client control portions 132 for sequential processing of the client requests 130. The method may prioritize the client control portions 132 based on at least one of a priority (e.g., high, medium, or low priority), a size, a user identifier, a client identifier, a latency, a device identifier, or a control portion verification. In some examples, the method 500 further includes sequentially processing client requests 130 based on their respective prioritization. Additionally, the method 500 may further include retrieving the payload portion 134 of a client request 130 having a first highest prioritization, a second highest prioritization, or a third highest prioritization. In some examples, the payload retriever 240 retrieved a predetermined number of payload portions 134 from the client 120 for respective control portions 132 of a client request 130 based on their position in the buffer 230 (e.g., the payload 240 retrieves the payload portion 134 of the last three control portions 132 in the buffer 230).

In some implementations, retrieving the payload portion 134 includes accessing non-transitory memory of the client 160 using remote direct memory access (RDMA). After processing a client request 130, the method 500 may include sending a processed payload 136 to the client 120 of the processed client request 130. Additionally, the method may include determining if the client of the processed client request 130 has sufficient memory 160 available to receive the processed payload 136, and sending the processed payload 136 to the respective client 120 when the client 120 has sufficient memory 160 available.

In some examples, the client 120 desires a service from a server 210, and requires that the service be performed within a specific amount of time. Therefore, the control portion 132 may include a time duration for completion of the client request 130. The method 500 may include sending the respective client 120 a message when its client request 130 cannot be processed within the specified time duration. In some examples, the method rejects a client request 130 when that client request 130 is non-processable within the specified time duration, or for any other reason that the server 210 is not able to process the client request 130. This allows the client 120 to send the request 130 to another server 210, and avoids a delay of having the request 130 (including the control and payload portions 132, 134) be queued in a buffer before processing.

Figure 6:
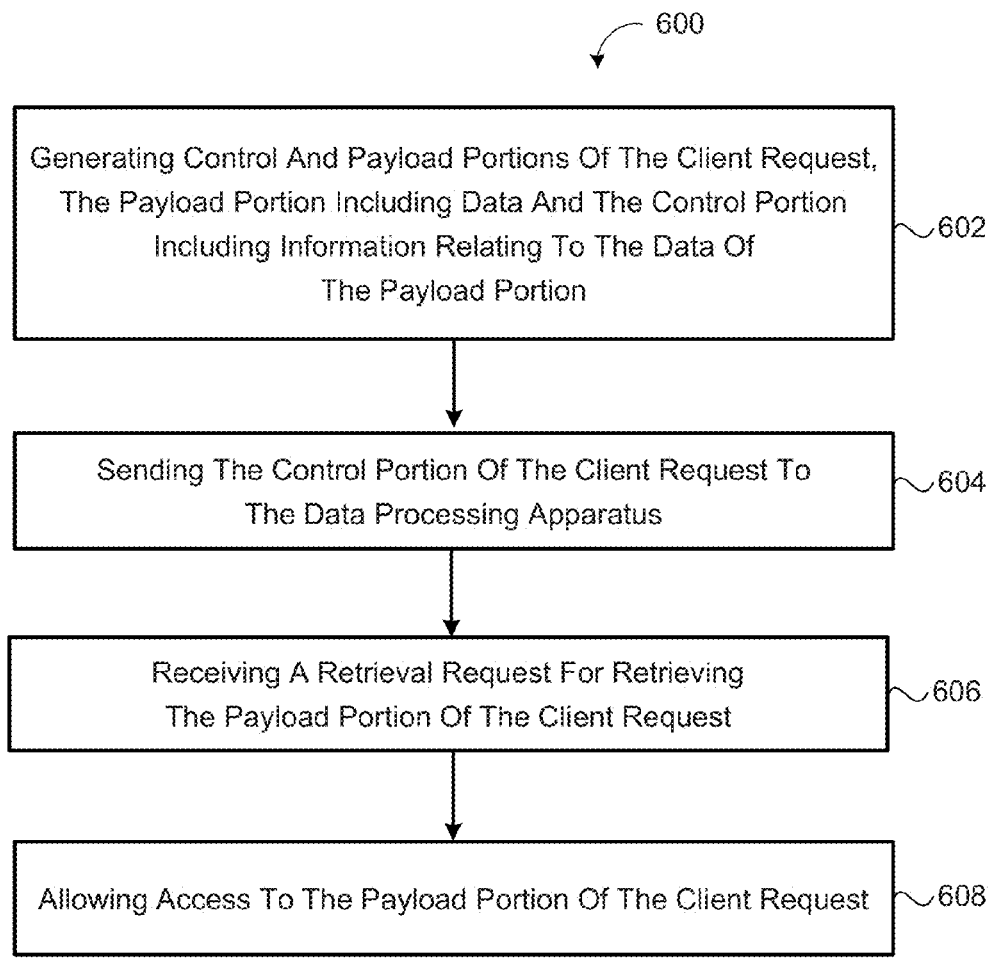
FIG. 6 provides an exemplary arrangement of operations for a method of sending client requests.

Referring to FIG. 6, in some implementations a method 600 of sending a client request 130 to a data processing apparatus 210 is provided. The method 600 includes generating 602 control and payload portions 132, 134 of the client request 130. The payload portion 134 includes data and the control portion 132 includes information relating to the data of the payload portion 134. The method 600 includes sending 604 the control portion 132 of the client request 130 to the data processing apparatus 210, receiving 606 a retrieval request for retrieving the payload portion 134 of the client request 130, and allowing 608 access to the payload portion 134 of the client request 130.

In some implementations, the method 600 includes allowing retrieval of the payload portion 134 through remote direct memory access (RDMA). Other retrieval methods of the payload portion 134 may be used. The client control portion 132 may include at least one of a priority (e.g., high, medium, or low priority), a size, a user identifier, a client identifier, a latency, a device identifier, or a control portion verification. After sending the control portion 132 of the client request 130 to the server 210, the method 600 may include receiving a processed payload 136 from the server 210 corresponding to the payload portion 134 of the client request 130. Additionally, the method may further include receiving the processed payload 136 when the client 120 has sufficient memory 160 capacity. In some examples, the method 600 includes sending multiple control portions 134 of corresponding client requests 130 to the data processing apparatus 210 in a first sequential order, and receiving retrieval requests for payload portions of the client requests in a second sequential order different form the first sequential order.

In some implementations, the client 120 requires that a request 130 be completed in a specific amount of time. The client 120 includes a time duration for completion of the client request 130 in the control portion 132. The server 210 may then determine whether it can perform the client request 130 within the specified time. In some examples, the method 600 includes receiving a message from the data processing apparatus 210 when the client request 130 is non-processable within the specified time duration. Additionally, the method may include resending the client control portion 134 of the client request 130 when the client request is non-processable within the specified time duration. The client 120 may send the request 130 to the same or another server 210.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, non-transitory memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a non-transitory memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of processing client requests on a data processing apparatus of a server, the method comprising:
    receiving control portions of client requests from respective client devices without using remote direct memory access to access client memory storage hardware of the respective client devices, each client request having control and payload portions, the payload portion including data and the control portion including information relating to the data of the payload portion;
    buffering, in server memory storage hardware in communication with the data processing apparatus, the received client request control portions; and
    after buffering the received control portions of the client requests and when processing one of the client requests:
        accessing client memory storage hardware of the respective client device using remote direct memory access to retrieve the corresponding payload portion of the received buffered client request control portion before processing the client request and without allocating memory in the server memory storage hardware for the retrieved payload portion; and
        processing the client request and sending a processed payload to the respective client device of the processed client request.

2. The method of claim 1, further comprising prioritizing the client control portions for sequential processing of the client requests.

3. The method of claim 2, further comprising sequentially processing client requests based on their respective prioritization.

4. The method of claim 3, further comprising retrieving the payload portion of a client request having a first highest prioritization, a second highest prioritization, or a third highest prioritization.

5. The method of claim 2, further comprising prioritizing the client control portions based on at least one of a priority, a size, a user identifier, a client identifier, a latency, a device identifier, or a control portion verification.

6. The method of claim 1, wherein the control portion includes a specified time duration for completion of the client request.

7. The method of claim 6, further comprising sending the respective client a message when its client request cannot be processed within the specified time duration.

8. The method of claim 6, further comprising rejecting a client request when that client request is non-processable within the specified time duration.

9. The method of claim 1, further comprising:
    determining if the client of the processed client request has sufficient memory space available in the corresponding client memory storage hardware to receive the processed payload; and
    sending the processed payload to the respective client when the client has sufficient memory space available.

10. A system executing on a data processing apparatus for processing client requests, the system comprising:
    a receiver executing on the data processing apparatus and receiving control portions of client requests from respective client devices without using remote direct memory access to access client memory storage hardware of the respective client devices, each client request having control and payload portions, the payload portion including data and the control portion including information relating to the data of the payload portion;
    a buffer executing on the data processing apparatus and buffering, in server memory storage hardware in communication with the data processing apparatus, the received client request control portions;
    a payload retriever executing on the data processing apparatus, and after the buffer buffers the received client request control portions, the payload retriever:
        receives the buffered client request control portions from the buffer; and
        retrieves each of the corresponding payload portions of the received buffered client request control portions by accessing the client memory storage hardware of the respective client devices using remote direct memory access without allocating memory in the server memory storage hardware for the retrieved payload portions; and
    a request processing device executing on the data processing apparatus, and after the payload retriever retrieves the corresponding payload portions from the respective client device, the request processing device processes the client requests and sends a processed payload to the respective client device of each processed client request.

11. The system of claim 10, wherein the receiver prioritizes the client control portions for sequential processing of the client requests.

12. The system of claim 11, further comprising a request processing device that sequentially processes the client requests based on their respective prioritization.

13. The system of claim 12, wherein the payload retriever retrieves the payload portion of a client request having a first highest prioritization, a second highest prioritization, or a third highest prioritization.

14. The system of claim 11, wherein the receiver prioritizes the client control portions based on at least one of a priority, a size, a user identifier, a client identifier, a latency, a device identifier, or a control portion verification.

15. The system of claim 10, wherein the request processing device:
   determines if the client device of the processed client request has sufficient memory space available in the corresponding client memory storage hardware to receive the processed payload; and
   sends the processed payload to the respective client when the client device has sufficient memory space available.

16. The system of claim 10, wherein the control portion includes a specified time duration for completion of the client request, and when a client request is non-processable within the specified time duration, the request processing device sends the respective client device a message.

17. A method of sending a client request to a data processing apparatus, the method comprising:
   generating, using a client computing device, control and payload portions of the client request, the payload portion including data and the control portion including information relating to the data of the payload portion;
   sending, using the client computing device, the control portion of the client request to the data processing apparatus without using remote direct memory access; and
   after the data processing apparatus buffers the sent control portion of the client request, receiving, at client memory hardware in communication with the client computing device, a remote direct memory access retrieval of the payload portion of the client request from the client memory storage hardware without allocating memory in server memory storage hardware in communication with the data processing apparatus for the retrieved payload portion; and
   after the data processing apparatus retrieves the payload portion, receiving, at the client computing device, a processed payload from the data processing apparatus corresponding to the payload portion of the client request.

18. The method of claim 17, wherein the control portion includes a specified time duration for completion of the client request.

19. The method of claim 18, further comprising receiving a message from the data processing apparatus when the client request is non-processable within the specified time duration.

20. The method of claim 19, further comprising resending the client control portion of the client request when the client request is non-processable within the specified time duration.

21. The method of claim 17, wherein the client control portion comprises at least one of a priority, a size, a user identifier, a client identifier, a latency, a device identifier, or a control portion verification.

22. The method of claim 17, further comprising receiving the processed payload when the client has sufficient memory capacity in the client memory hardware.

23. The method of claim 17, further comprising:
   sending multiple control portions of corresponding client requests from the client computing device to the data processing apparatus in a first sequential order; and
   receiving remote direct memory access retrievals of the payload portions of the client requests from the client memory hardware in a second sequential order different from the first sequential order.

24. A system for sending a client request to a data processing apparatus, the system comprising:
   a request portion generator generating control and payload portions of the client request, the payload portion including data and the control portion including information relating to the data of the payload portion; and
   a messenger sending the control portion of the client request to the data processing apparatus without the data processing apparatus using remote direct memory access to access client memory storage hardware, wherein the client memory storage hardware stores the payload portion accessible for retrieval by the data processing apparatus through remote direct memory access after the data processing apparatus buffers the sent control portion of the client request and without allocating memory in server memory storage hardware in communication with the data processing apparatus for the retrieved payload portion; and
   a receiver that receives a processed payload from the data processing apparatus corresponding to the payload portion of the client request.

25. The system of claim 24, wherein the control portion includes a specified time duration for completion of the client request.

26. The system of claim 25, wherein the receiver receives a message from the data processing apparatus when the client request is non-processable within the specified time duration.

27. The system of claim 26, wherein the messenger resends the client control portion of the client request when the client request is non-processable within the specified time duration.

28. The system of claim 24, wherein the client control portion comprises at least one of a priority, a size, a user identifier, a client identifier, a latency, a device identifier, or a control portion verification.

29. The system of claim 24, wherein the receiver allows receipt of the processed payload when the client memory storage hardware has sufficient capacity.

30. The system of claim 24, wherein the messenger sends multiple control portions of corresponding client requests to the data processing apparatus in a first sequential order; and the receiver receives processed payload portions from the data processing apparatus in a second sequential order different form the first sequential order.

* * * * *